Sept. 28, 1971        A. G. BARRETT        3,608,390
VARIABLE SPEED DRIVE
Filed Aug. 12, 1969        3 Sheets-Sheet 1
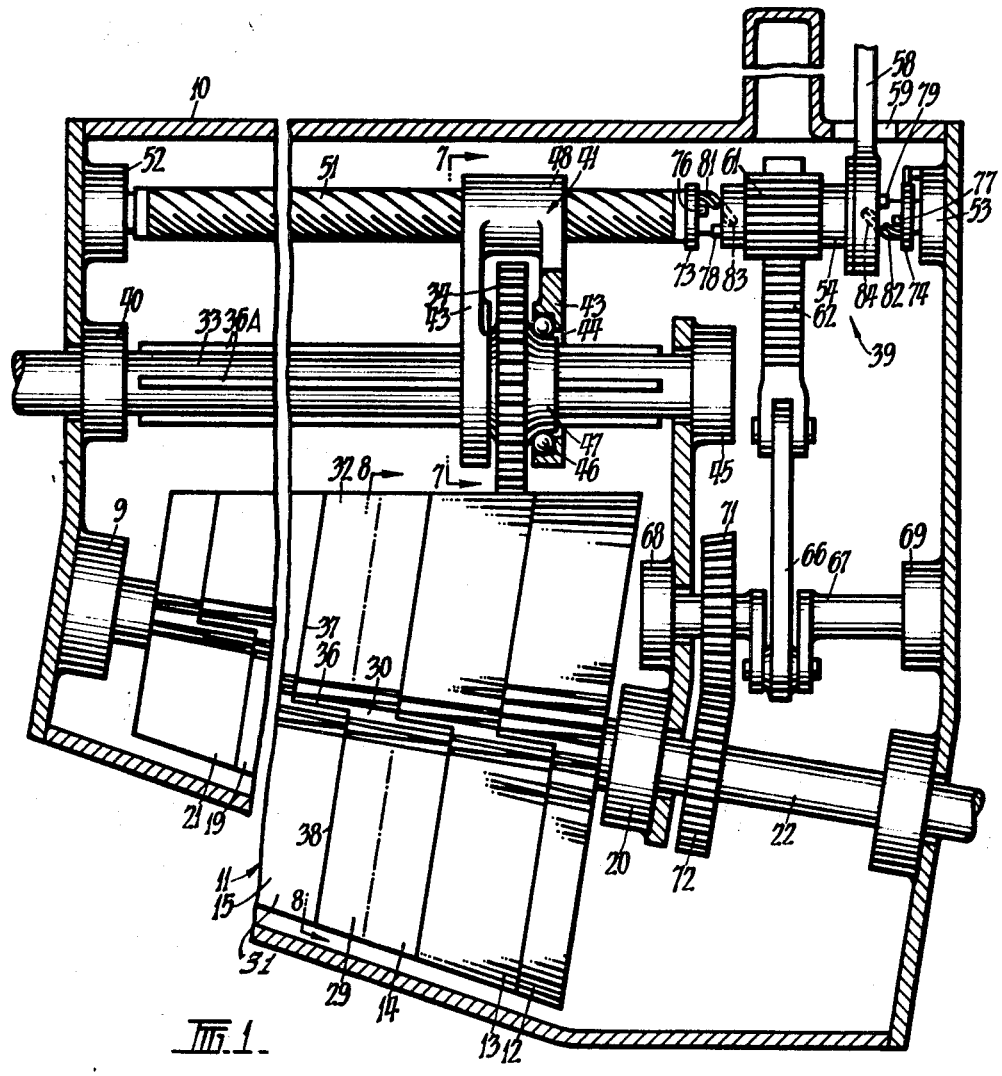
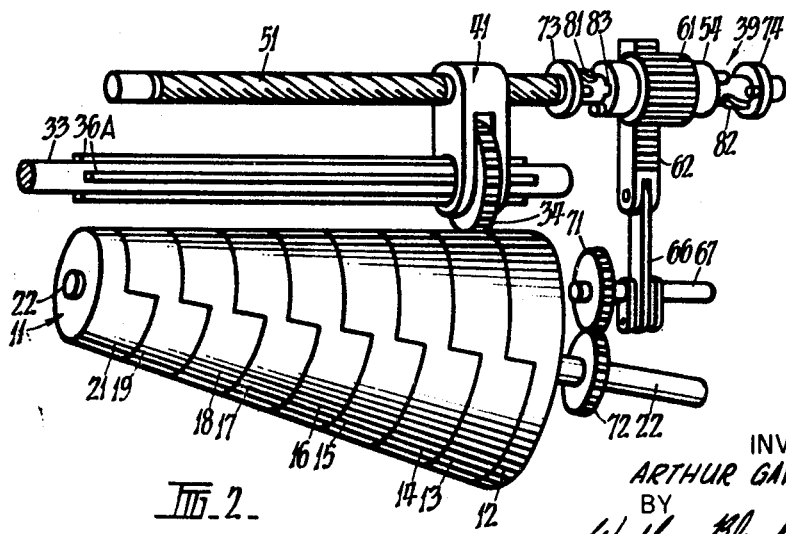
INVENTOR
ARTHUR GAVIN BARRETT
BY
ATTORNEYS

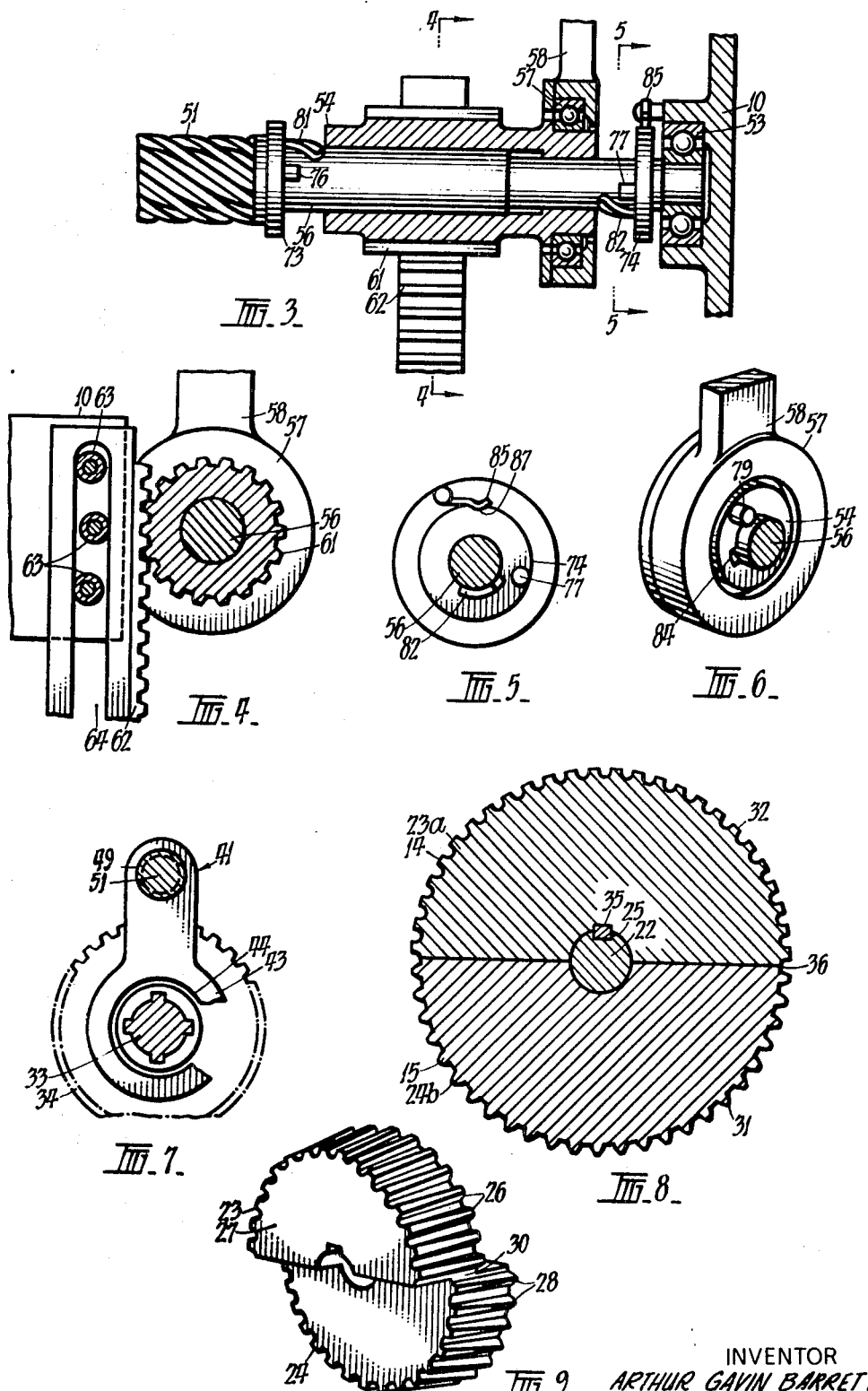

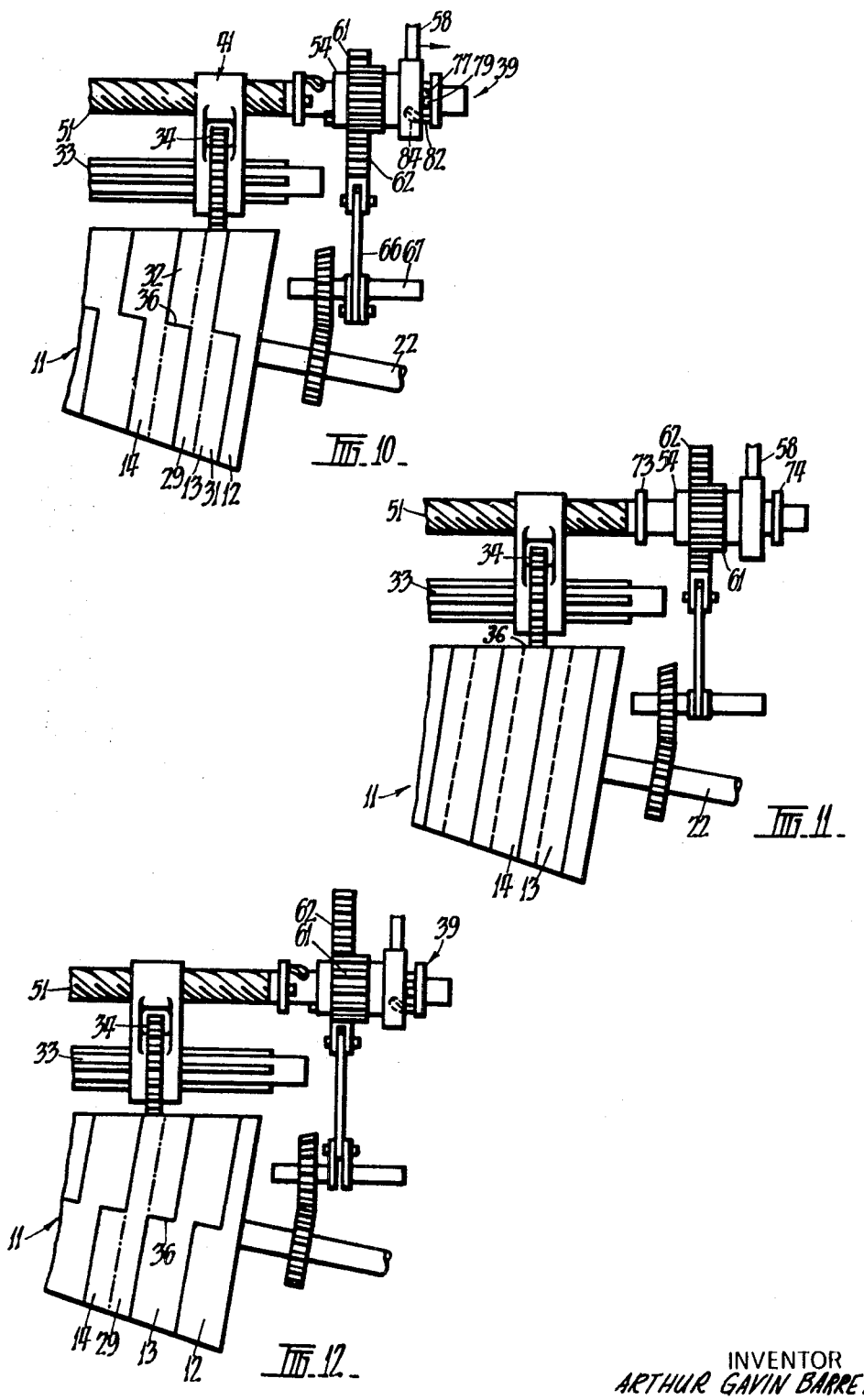

United States Patent Office 3,608,390
Patented Sept. 28, 1971

3,608,390
VARIABLE SPEED DRIVE
Arthur G. Barrett, 13 Virginia St.,
Newtown, Victoria, Australia
Filed Aug. 12, 1969, Ser. No. 849,398
Claims priority, application Australia, Aug. 12, 1968,
42,006/68
Int. Cl. F16h 3/08, 3/22
U.S. Cl. 74—348                 11 Claims

ABSTRACT OF THE DISCLOSURE

A variable speed ratio gear system utilizing a conical toothed member made up of an axial stack of gears with varying numbers of teeth, individual gears of the stack consisting of pairs of axially offset pairs, so that the peripheral interface line between adjacent gears has a portion extending generally lengthwise of the conical member.

BACKGROUND OF THE INVENTION (1) Field of the invention

This invention relates to a variable speed ratio drive system.

SUMMARY OF THE INVENTION

According to the invention there is provided a variable speed ratio drive system comprising; a composite toothed member of substantially conical form; said composite member consisting of a plurality of adjacent coaxial toothed gears of varying diameter mounted on a first shaft and adapted to rotate with each other and with the shaft, the teeth on complementary portions of each adjacent pair of said coaxial toothed gears being extended in a direction generally parallel to the axis of said composite member to form projecting peripheral gear portions, one on each pair, the projecting gear portion on each gear of the pair extending into a corresponding peripheral space on the other of the pair; a toothed wheel mounted on a second shaft arranged substantially parallel to the generating line of the conical composite member and adapted to be moved to engage any one of said gears forming the composite member; and gear changing means adapted to move said toothed wheel from one gear to an adjacent gear.

The invention is now described in detail with reference to the accompanying drawings.

BRIEF DESCRIPTION OF THE DRAWINGS

FIG. 1 is a longitudinal cross-section of a drive system constructed in accordance with the invention;

FIG. 2 is a partly diagrammatic perspective view illustrating the principal working parts of the system shown in FIG. 1;

FIG. 3 is a fragmentary cross-section of portion of a gear changing mechanism incorporated in the gear drive system shown in FIG. 2;

FIG. 4 is a fragmentary cross-section on the line 4—4 of FIG. 3;

FIG. 5 is a fragmentary cross-section on the line 5—5 of FIG. 3;

FIG. 6 is a perspective view of portion of the gear changing mechanism of the drive system shown in FIG. 1;

FIG. 7 is a fragmentary cross-section, with part broken away, on the line 7—7 of FIG. 1;

FIG. 8 is a cross-section on the line 8—8 of FIG. 1;

FIG. 9 is a perspective view of a toothed gear incorporated in the composite toothed member of the drive system shown in FIG. 1;

FIGS. 10 to 12 are fragmentary views corresponding to portion of FIG. 1 but illustrating various stages in the operation of the gear changing mechanism incorporated in the drive system of FIG. 1.

DESCRIPTION OF PREFERRED EMBODIMENTS

The drive system shown in the drawings is contained within an outer casing 10. It includes a conical shaped composite toothed member 11 made up of a number of toothed gears, 12 to 21 inclusive, mounted for rotation with a driving shaft 22 and arranged adjacent each other so as to form an uninterrupted conical surface. Shaft 22 is journalled in bearings 9, 20 and has a longitudinal keyway 25, the gears 12–21 being secured to the shaft by a key 35. The gears are thus fixed relative to each other. The numbers of teeth on the gears 12–21 are chosen so that the larger diameter gear of each adjacent pair has two more teeth than the smaller gear of the pair. Thus if the smallest diameter gear 21 of the composite member is provided with $x$ teeth, then its adjacent gear 19 will be provided with $x+2$ teeth and the gear 18 adjacent gear 19 will be provided with $x+4$ teeth and so on.

The gears 12–21 are conical involute gears and a representative gear is shown in FIG. 9. It is in the form of a pair of axial offset gear halves 23, 24. The gear is cut from a conical blank such that the base pitch and working depth remain constant. This may be done by using a rack such as is used for producing spur gears and in the same manner as for producing conventional spur gears except that the blank is inclined to the rack in such a manner that its conical surface is parallel to the rack. Thus the tooth thickness and base pitch remain the same across the face width although the tooth form varies across the face width. In particular, the teeth 26 on gear half 23 tend to be undercut at the smaller diameter face 27 whilst the teeth 28 on gear half 24, and at the larger diameter face, tend to be pointed.

The displacement of the gear halves 23, 24 is such that each gear defines a continuous peripheral toothed portion 29 (see FIG. 1) and a pair of generally semi-circular peripheral toothed extensions 31, 32 one to each side of portion 29.

The gears 12–21 each have an even number of teeth so that there is an integral number of teeth upon each gear half 23, 24. Further, for each gear 12–21 the disposition of teeth relative to the plane of disjunction between the gear halves is the same. In the gear shown in FIG. 9 the arrangement of the gear teeth 26, 28 is such that at each diametral side of the gear a tooth root 30 coincides exactly with the plane of disjunction of the halves. All of the gears of the composite toothed member thus have teeth roots positioned in exactly the same manner. Other dispositions are, of course, possible, such as an arrangement in which a tooth is disposed at each diametral side of the gear and symmetrically disposed with respect to the plane of disjunction of the gear halves, but whatever disposition is adopted it should be the same for each gear.

Drive from the composite member 11 is effected to a driven shaft 33 by means of a toothed wheel 34 mounted thereon. Shaft 33 is journalled in bearings 40, 45 and has a number of longitudinal splines 36A so that, although gear 34 may slide therealong, the gear and shaft are rotatable together. Shaft 33 extends generally parallel to the generating line of the cone shaped composite member 11 and the toothed wheel 34 is adapted to engage any one of gears 12–21. During normal running, toothed wheel 34 runs upon a selected one of gears 12–21 and upon continuous peripheral portion 29 thereof.

It will be appreciated that, because there are different numbers of teeth upon adjacent pairs of gears the teeth of each adjacent pair are not all aligned across the full face width of both gears. Thus, it is not possible to shift toothed wheel 34 from one gear say 14 to its adjacent gear 15 by merely effecting arbitrary axial shifting of toothed wheel 34. However, because of the specific construction and alignment of the teeth on the individual gears 12–21 there are peripheral portions of composite toothed member 11 which consist of a portion 31 of one gear 14 and a portion 32 of its adjacent gear 15. FIG. 8 is a cross-section at such a location and shows a gear half 23a of gear 14 and a gear half 24b of adjacent gear 15. Gear portion 32 of half 23a has more teeth than portion 31 on half 24b but the teeth adjacent the plane of disjunction (36) between the halves are aligned so that toothed wheel 34 may run over portions 31, 32 without losing mesh. Thus, in order to shift from gear 14 to gear 15 all that is required is to shift wheel 34 axially so that it is engaged firstly upon the portion 32 of the gear and then upon portion 31 of gear 15 as the composite member rotates. After this shifting onto portion 31 has occured the toothed wheel is then moved to the continuous peripheral portion 29 thereof, to complete the change.

It will be appreciated that some substantial loading upon toothed wheel 34 may arise because of the deceleration which occurs during movement from driving engagement by gear portion 32 to driving engagement by gear portion 31. It is thus highly desirable that the toothed wheel not be permitted, during gear change to run continuously over gear portions 31, 32. Again, during changing it is essential that toothed wheel 34 not be permitted to be located so that it is engaged by the pair of adjacent gears simultaneously, since, as mentioned previously, there is no tooth alignment between these gears and damage to the mechanism would almost certainly occur.

Bearing the above in mind, it is clear that gear changing between adjacent gears 12–21 should preferably be effected during a single revolution of composite toothed member 11 and must be arranged so that the path of the toothed wheel on composite toothed member 11 is such as to pass only through the axially extending portion 36 (FIG. 1) of the boundary line on member 11 between the adjacent gears and not over the circumferentially extending portions 37 or 38 thereof. This is accomplished by means of a gear changing mechanism 39.

Mechanism 39 includes a yoke member 41 (FIGS. 1, 2 and 7) which has a pair of arms 43 arranged one to each side of toothed wheel 34. Shaft 33 passes through apertures 44 in arms 43. Each aperture 44 has a thrust bearing 46, and bosses 47 on toothed wheel 34 are engaged within these so that wheel 34 is freely rotatable relative to yoke member 41, but is constrained against substantial axial movement relative to the yoke member.

Yoke 41 has an intermediate portion 48, from which arms 43 extend, and this portion is provided with an internally threaded bore 49. A threaded screw-shaft 51 extends through bore 49 and generally parallel to shaft 33. Screw-shaft 51 is freely rotatable in bearings 52, 53 so that rotational movement thereof causes axial advancement of yoke 41 along the shaft. As best seen from FIG. 3, screw-shaft 51 carries an axially slidable, generally cylindrical sleeve 54 which is freely rotatable upon a stepped cylindrical shank portion 56 of the shaft. Sleeve 54 is mounted at one end for free rotation within a bearing 57 but is fixed within the bearing so that axial movement therein is precluded. A gear change lever 58 extends from bearing 57 and through an opening 59 in casing 10. By movement of lever 58 axially of screw-shaft 51 it is possible to effect corresponding movement of sleeve 54 on the shaft. Sleeve 54 also has an external toothed pinion 61, which is in driven engagement with a toothed rack 62. Rack 62 is mounted for reciprocating movement upon three transverse rollers 63 mounted within casing 10. The rollers extend within an elongate slot 64 on rack 62 and bear against internal faces thereof.

The rack is pivotally secured at one end to a connecting rod 66 and the other end of the connecting rod is pivotally and eccentrically secured to a crankshaft 67. Crank-shaft 67 extends generally parallel to shafts 33 and 51 and is freely rotatable within bearings 68, 69.

A gear 71 is secured to crankshaft 67 and is drivingly engaged by a gear 72 secured to shaft 22. Rotation of shaft 22 thus causes reciprocation of rack 62 and corresponding oscillatory motion of sleeve 54. Since shafts 22 and 67 are non-parallel, gears 71, 72 must be of a type capable of driving under these conditions. A pair of bevel gears, or a conical involute gear and a spur gear, as shown, are suitable.

Screw-shaft 51 has a pair of flanges 73, 74 arranged a separate one to each side of sleeve 54. Flange 73 has a projecting pin 76 spaced radially from the axis of shaft 51 and extending towards sleeve 54, and flange 74 has a similar pin 77 also extending towards sleeve 54. Sleeve 54 carries a pair of pins 78, 79 one at each end thereof and projecting towards the respective flanges 73, 74.

Sleeve 54 is axially slidable between a location in which pin 78 is positioned for driving engagement with pin 76 and a location in which pin 79 is positioned for driving engagement with pin 77. The flanges 73, 74, pins 76–79 and the associated axial ends of sleeve 54 thus form a pair of dog clutches.

Shank portion 56 of screw-shaft 51 has a pair of screw threads 81, 82 which are of the same helix direction and arranged adjacent flanges 73, 74 respectively. Sleeve 54 has a pair of corresponding mating grooves 83, 84 on the internal surface thereof and the screw threads 81, 82 are respectively engageable in these when the sleeve is shifted towards the respective associated flanges 73, 74.

In order to provide frictional resistance to rotation of screw-shaft 51, a spring clip 85 cooperates with an indentation 87 on flange 74 so as to tend to prevent rotation of shaft 51 through more than one revolution unless the shaft is positively driven.

In use, driving shaft 22 is rotated to rotate member 11 and driven shaft 33, which serves as the output shaft, via toothed wheel 34. At the same time, crank shaft 67 is rotated causing rack 62 to execute reciprocating movement. Normally, sleeve 54 is positioned at its intermediate position so that although it executes oscillatory motion by virtue of the drive from rack 62, this motion is not transmitted to screw-shaft 51. However, when it is desired to change the speed ratio, change lever 58 is moved so that sleeve 54 is shifted to drive the screw-shaft. This is illustrated in more detail in FIGS. 10 to 12, which show the sequence of operations for changing toothed wheel 34 from engagement with gear 13 to engagement with gear 14.

FIG. 10 shows the disposition of the relevant parts at the initiation of the gear changing sequence. Wheel 34 is engaged upon portion 29 of gear 13, and sleeve 54 is being moved to engage pins 77 and 79 of the right hand dog clutch.

It will be appreciated that engagement of the pins will only occur upon motion of sleeve 54 in one rotational direction (anti-clockwise when viewed from the right hand side of the mechanism) because of the necessity from complete engagement of the thread 82 within groove 84 before the pins can engage.

When the sleeve rotates in the opposite direction, the screw thread immediately disengages and no motion is transmitted to screw-shaft 51. Also regardless of the specific time during the cycle of oscillatory motion of sleeve 54 at which the sleeve is moved, driving engagement between the pins 77, 79 will not occur until a specific time in that cycle. This specific time is arranged, by appropriate selection of the drive ratio of gears 71, 72, that of rack 62 and pinion 61, and of the relative angular position of crank eccentric of crank shaft 67, to always correspond to a relative angular position of crank eccentric of shaft 67, to always correspond to a relative rotational positioning of member 11 such that the toothed wheel is engaged with a part of the gear portion 29 adjacent a portion 32 thereof. As soon as driving engagement of pins 77, 79 takes place, then, screw-shaft 51 is rotated to shift yoke member 41 axially away sleeve 54 and toothed wheel 34 begins to move onto portion 32 of gear 13. This motion continues, as member 11 rotates, until, when the gear interface line 36 is positioned opposite wheel 34, the wheel is engaged entirely upon portion 32 as shown in FIG. 11.

As rotation of member 11 proceeds further, the toothed wheel is engaged upon the portion 31 of gear 14 and is subsequently shifted during further rotation of member 11 to a positon in which it is engaged with the portion 29 of gear 14, as shown in FIG. 12. All of the motion to shift wheel 34 occurs during a single counter-clockwise rotation of screw-shaft 51 which corresponds to a single upward movement of rack 62. When the rack reaches its uppermost position (FIG. 12) the pins 77, 79 are automatically disengaged by action of screw thread 82.

Gear changing from a smaller gear to an adjacent larger gear is effected in exactly the same manner as described above, and by movement of sleeve 54 to engage pins 76 and 78. In this case however, the movement of screw-shaft 51 occurs only upon the down strokes of rack 62 and the pins 76, 78 are disengaged during upward movements thereof.

It will be appreciated that the above described drive system is arranged to permit continuous ratio changing without the necessity of first stopping the rotation of member 11.

Whilst the specific construction is particularly advantageous in use, many modifications may of course be made. In particular, the specific construction of the gear changing mechanism may be varied, and in cases where there is no necessity to effect ratio changing during rotation, simplified.

As previously mentioned, there may be considerable loading upon the gear teeth of the composite member 11 and of toothed wheel 34 during ratio changing and in some instances, provision for absorption of this shock loading may be desirable. This could, for example, take the form of a resilient packing between the individual gears of member 11 and permitting limited angular movement between these. A suitable resilient coupling could also be provided for wheel 34 for this purpose.

It should be observed, in this regard, that although the portions of the gear teeth of the composite member which are required to accept the loading during gear changing (i.e. those on portions 31 and 32) are structurally weakest the life time of these parts of the teeth will normally be comparable with the life time of the stronger parts of the teeth on portions 29 of the gears. This arises because the higher loading will normally occur only on relatively infrequent occasions.

In another modification of the described construction the threaded portion of screw-shaft 51, which passes through yoke member 41 is arranged to be of lesser length than is shown in the drawings so that there are unthreaded portions respectively adjacent bearing 52 and adjacent flange 73. These portions are of greater axial extent than yoke 41 so that continued driving of screw-member 51 in either direction will cause the yoke to move onto these portions and cease to be driven, thus avoiding the possibility of jamming of yoke 41 against bearing 52 or against flange 73 as might otherwise occur through careless operation of the changing mechanism.

The described embodiment may be further modified to incorporate any suitable mechanism for causing automatic or other movement of gear change lever 58.

Again, whilst the individual gears 12-21 of the composite toothed member 11 are arranged such that each has two more teeth than its adjacent smaller gear, other differences being multiples of two such as four or six teeth may be utilized.

The above and many other modifications may be made to the described construction within the scope of the appended claims.

I claim:
1. A variable speed ratio drive system, comprising: first and second rotatable shafts;
a composite toothed member of substantially conical form mounted on and nonrotatably connected to said first shaft;
said composite toothed member including a plurality of adjacent coaxial toothed gears of varying diameter, each toothed gear of an adjacent pair of said toothed gears having teeth which extend toward the other gear of said pair in a direction substantially parallel to the axis of said second shaft and define a projecting peripheral gear portion which is complementary to a projecting peripheral gear portion on the other gear of said pair, the projecting gear portion on each gear of said pair extending into a corresponding peripheral space on the other gear of said pair whereby said gear portions on said pair of gears axially overlap;
said second shaft disposed substantially parallel to the generating line of the conical composite member and a rotatable toothed wheel mounted on said second shaft and disposed in meshing engagement with said composite toothed member; and
gear changing means for moving said toothed wheel relative to said composite member for permitting said toothed wheel to be moved into meshing engagement with any one of said coaxial toothed gears.

2. A variable speed ratio drive system as claimed in claim 1, wherein said gear changing means includes means for engaging said toothed wheel and moving it in the axial direction of said second shaft.

3. A variable speed ratio drive system as claimed in claim 2 wherein said means for engaging and moving the toothed wheel comprises a member which engages the toothed wheel, a screw-shaft which extends generally parallel to said second shaft and is engaged with a corresponding screw thread in said member and means for rotating said screw-shaft to effect axial movement of said member.

4. A variable speed ratio drive system as claimed in claim 3 wherein said means for rotating said screw-shaft includes a rotatable member selectively couplable to said screw-shaft.

5. A variable speed ratio drive system as claimed in claim 4 wherein said means for rotating said screw-shaft further includes clutch means for effecting said selective coupling of said rotatable member to said crew-shaft.

6. A variable speed ratio drive system as claimed in claim 5 wherein said means for rotating said screw-shaft further includes a pinion on said rotatable member and a rack drivingly engageable therewith, together with means for causing said rack to execute lengthwise reciprocating movement whereby to cause said rotatable member to execute rotary oscillatory motion about its axis of rotation.

7. A variable speed ratio drive system as claimed in claim 6 wherein said rotatable member is carried by, and is freely rotatable upon, said screw-shaft and said clutch means comprises a pair of clutches, each of said clutches comprising a separate pair of engageable clutch member, one clutch member of each pair being mounted upon said screw-shaft and to opposite sides of said rotatable member, the other clutch member of each pair being located on said rotatable member at ends thereof respectively adjacent the other of its pair, said rotatable member being slidable axially of said screw-shaft to a position in which one of said clutches is engaged, to a position in which the other is engaged and to an intermediate position in which neither is engaged.

8. A variable speed ratio drive system as claimed in claim 7 wherein said means for causing said rack to execute lengthwise reciprocating movement comprises a crank shaft and a connecting rod secured to said crank shaft and to said rack.

9. A variable speed ratio drive system as claimed in claim 7 wherein said screw-shaft and said rotatable member as provided with co-operating thread means permitting engagement of each of said respective clutches only during oppositely directed oscillatory motions of said screw-shaft whereby motion of said rotatable member may be imparted to said screw-shaft in the one direction only by engagement of one of said clutches and in the other direction only by engagement of the other clutch.

10. A variable speed ratio drive system as claimed in claim 1, wherein said composite toothed member includes first and second coaxial gears of different diameters disposed directly adjacent one another and nonrotatably mounted on said first shaft, each of said first and second gears including an annular portion and a projecting portion fixedly connected to said annular portion and extending axially toward the other of said first and second gears, each of said gears having external teeth formed on said annular portion with said teeth extending axially of said projecting portion, the projecting portion of each gear having a toothed sector which extends through an angle substantially less than 360 degrees, and the toothed sectors of said first and second gears being axially overlapped and coacting with one another to form a continuous toothed periphery.

11. A variable speed ratio drive system as claimed in claim 10, wherein the toothed sectors of said first and second gears each extend through an angle of approximately 180 degrees.

References Cited

UNITED STATES PATENTS

| | | | |
|---|---|---|---|
| 1,471,162 | 10/1923 | Jacobacci | 74—348 |
| 1,508,879 | 9/1924 | Healey | 74—348 |
| 2,336,441 | 12/1943 | Paul | 74—348 |
| 2,821,863 | 2/1958 | Bliss et al. | 74—348 |
| 3,058,365 | 10/1962 | Gerchow | 74—348X |

ARTHUR I. McKEON, Primary Examiner

U.S. Cl. X.R.

74—373(Discl.)